united States Patent Office 3,319,288
Patented May 16, 1967

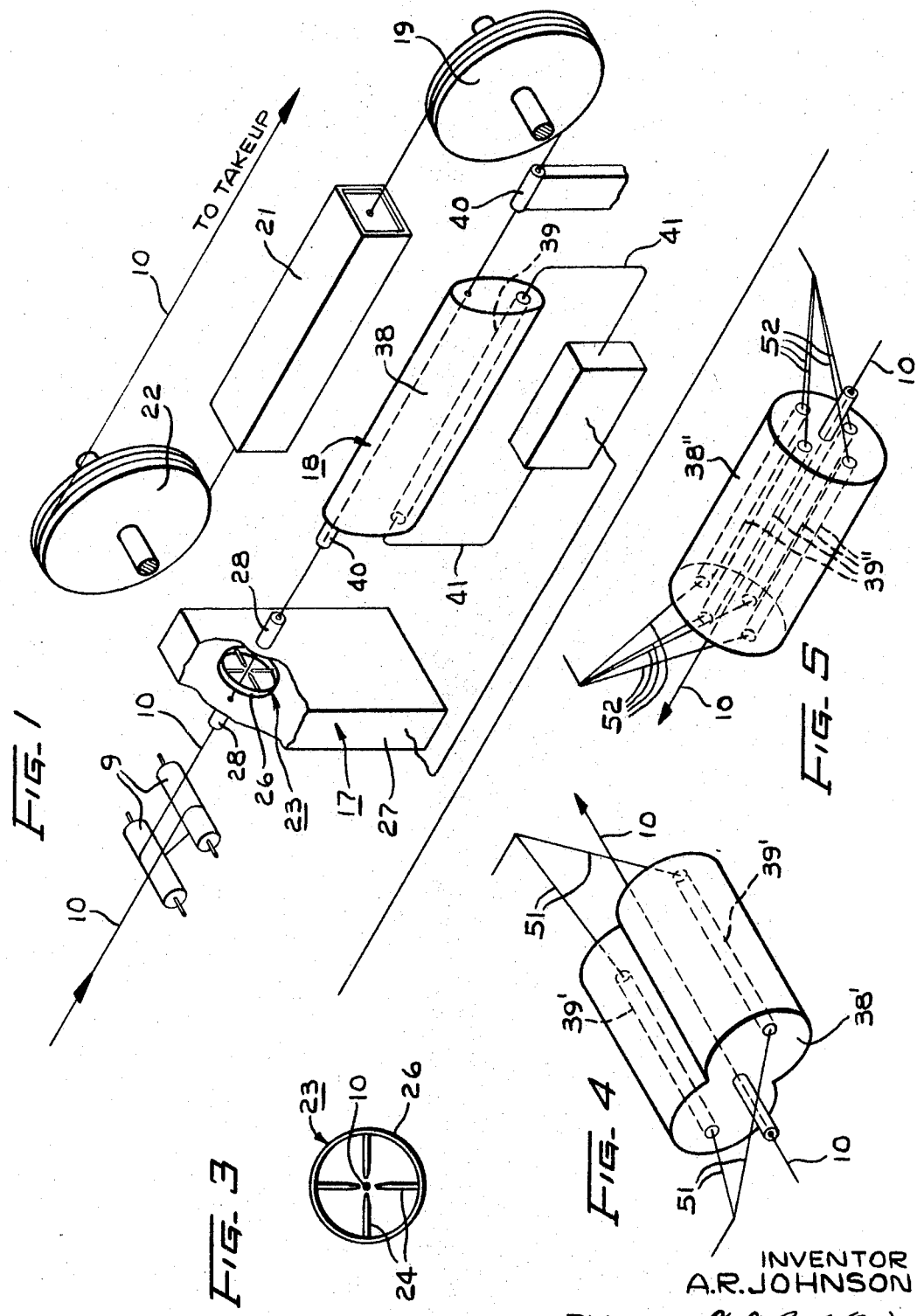

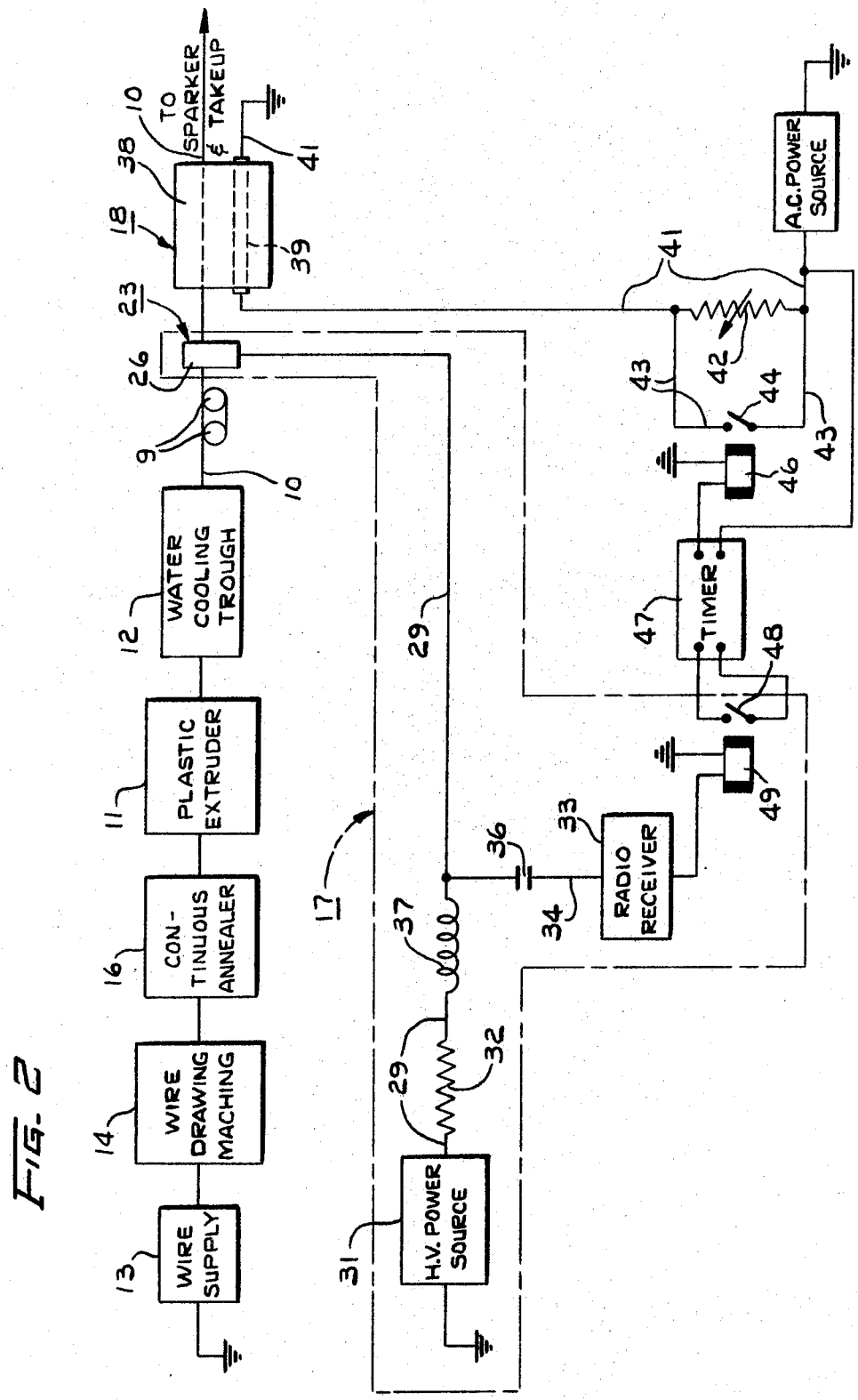

3,319,288
APPARATUS FOR REPAIRING MATERIAL
Arnold R. Johnson, Omaha, Nebr., assignor to Western Electric Company, Incorporated, New York, N.Y., a corporation of New York
Filed Oct. 24, 1963, Ser. No. 318,605
8 Claims. (Cl. 18—1)

This invention relates to apparatus for repairing material, and more particularly to apparatus for detecting a fault in the material and eliminating the fault by applying heat to the exterior of the material adjacent the fault. It is an object of this invention to provide new and improved apparatus of this character.

In the manufacture of insulated electrical conductor wire to be used in making communication cable, it is standard practice to pass the wire longitudinally through an extruding apparatus which extrudes insulation onto the wire. The insulated wire then travels through a water cooling trough, which cools the insulation so that it hardens about the wire, and about a capstan mechanism for advancing the wire through the extruding apparatus and the cooling trough. The insulation then is tested along its moving length for high voltage strength, correct diameter and other characteristics, and finally the insulated wire is wound on reels by a takeup mechanism.

Occasionally, the finished insulation on the wire includes a plurality of defective portions or faults therein, as for example, air voids and bubbles which are produced during the extrusion process, or cracks or splits which are caused as the insulated wire proceeds along the insulating line. These faults or defective portions are undesirable because they decrease the dielectric strength and the structural strength of the insulation, and thus have a similar adverse effect upon a cable into which the insulated wire is incorporated.

In the past, the fact that these faults exist has been taken into consideration by testing the insulation for high voltage strength, as noted hereinabove. This test involves counting the faults by subjecting the insulation on the wire to a high voltage spark as the wire proceeds along the insulating line, so that when a fault in the insulation is present ionization of the gas in the fault occurs to produce an electrical discharge which operates a counting device. When the faults exist in excess of a predetermined number and frequency, the wire is scrapped or repaired in a subsequent semiautomatic process, since it is not suitable for communication purposes. This procedure is undesirable from a cost standpoint because of the necessity of scrapping or repairing a certain amount of the wire manufactured, and because the wire which does meet manufacturing requirements still has defects or faults in its insulation which may break down under field conditions to cause an operating failure. This procedure is also undesirable because the spark produced when a fault is present in the insulation often increases the size of the fault, thereby increasing the tendency of the insulation to break down subsequently in operation.

Accordingly, another object of this invention is to provide new and improved apparatus for detecting a fault in the insulation of a longitudinally moving electrical conductor wire.

A further object of this invention is to provide new and improved apparatus for repairing insulation defects on an insulated electrical conductor wire as the wire is being advanced longitudinally.

Another object of this invention is to provide new and improved apparatus for detecting a fault in electrically nonconducting material without further aggravating the condition of the fault.

A further object of this invention is to provide new and improved apparatus for detecting and repairing faults in electrically nonconducting material.

A still further object of this invention is to provide new and improved apparatus for detecting and repairing faults in an elongated strand, formed at least in part of electrically nonconducting material, during relative movement of the strand and the apparatus in a direction extending parallel to the longitudinal axis of the strand.

In accordance with the invention, electrically nonconducting material is subjected to a sufficiently high electrical stress as to produce an electrical discharge at a fault in the material. The electrical discharge operates a mechanism for detecting the fault, after which localized heat is applied to the exterior of the material adjacent the detected fault to cause the material in the vicinity of the fault to flow such that when the material subsequently resolidifies the fault is substantially eliminated.

In a preferred embodiment of the invention, a plurality of needle-like electrodes are arranged in radially extending relationship with respect to a longitudinally moving insulated electrical conductor wire. The electrodes are connected by circuitry to a source of high direct current voltage to maintain a relatively high direct current voltage potential between the electrodes and the wire, so that when a fault in the insulation on the wire comes adjacent the electrodes ionization of the gas in the fault occurs and an electrical discharge is produced at the fault. The circuitry connecting the electrodes to the high voltage source is designed to limit the energy value of this electrical discharge so that only corona discharge and a resulting radio frequency energy emission are produced at the fault, without an accompanying electrical arc or spark which might further aggravate the condition of the fault. The connecting circuitry also is designed to prevent the radio frequency energy, which actuates a fault detecting mechanism, from flowing to ground through the high voltage source. The fault detecting mechanism, upon being actuated, operates a relay in an energizing circuit for an electrical heating element of a heating device through which the insulated wire then passes.

The heating device is in the form of an elongated chamber having the electrical heating element mounted therein, and having an interior reflecting surface for concentrating the heat derived from the heating element about the periphery of the wire as it passes through the chamber. The heating element is capable of producing heat energy in an amount sufficient to cause the insulation on the wire to flow as the wire passes through the chamber such that the fault is substantially eliminated upon resolidification of the insulation. The heating element's energizing circuit is designed to provide quick energization of the heating element upon the detection of a fault in the insulation, and such that the magnitude of the current required in the circuit for energizing the heating element is kept to a minimum.

This invention, together with further objects and advantages thereof, will best be understood with reference to the following detailed description taken in connection with the accompanying drawings in which:

FIG. 1 is an isometric schematic view of a portion of a tandem wire drawing and insulating line illustrating one application of the invention;

FIG. 2 is a combined electrical circuit and schematic diagram further illustrating the application of the invention illustrated in FIG. 1;

FIG. 3 is an enlarged detailed view of a part of the invention illustrated in FIG. 1;

FIG. 4 is an isometric view illustrating a modification of a part of the invention illustrated in FIG. 1; and FIG. 5 is an isometric view illustrating another modification of the same part of the invention as is illustrated in FIG. 4.

Referring to FIGS. 1 and 2 of the drawing, it is seen that the illustrated embodiment of the invention is shown in combination with apparatus forming a part of a tandem wire drawing and insulating line, and including a capstan mechanism 9 for advancing an electrical conductor wire 10 from an extruding apparatus 11 (FIG. 2) for extruding plastic insulation onto the wire, and a water cooling trough 12 (FIG. 2) which cools the extruded insulation so that it solidifies about the wire. The wire 10, prior to entering the extruding apparatus 11, is pulled from a source of supply 13 and is drawn to size in a wire drawing machine 14, after which it is annealed in an annealer 16.

The illustrated embodiment of the invention is designed to detect a fault or defective portion in the insulation on the wire 10, such as a split, crack or an air void, including an interior air void enclosed within the insulation, and then to apply localized heat to the exterior of the insulation adjacent the fault in an amount sufficient to cause the insulation to flow, such that the fault is substantially eliminated upon resolidification of the insulation. Thus, referring to FIG. 1, it is seen that the insulated wire 10 proceeds from the capstan 9 through a fault detecting device 17 and then through a heating device 18 which form parts of the illustrated embodiment of the invention. The insulated wire 10 passes from the heating device 18 about an idler sheave 19 and through a conventional fault detector or sparker 21, which is designed to subject the insulation on the wire to a high voltage spark after it has been repaired, to determine whether the repaired insulation still includes any faults and in what frequency. The insulated wire 10 then passes about an idler sheave 22 to a device (not shown) which checks it for proper diameter, and finally is wound on reels by a suitable takeup mechanism (not shown).

As is best shown in FIGS. 1 and 3, the fault detecting device 17 includes a probe 23 having a plurality of electrodes 24 arranged in radially extending relationship with respect to a common point and having adjacent inner ends spaced radially from the point so that the insulated wire 10 can move longitudinally through the point in close proximity to the inner ends of the electrodes. The inner ends of the electrodes 24 are in the form of needlelike points which facilitate the formation of corona discharge at a fault in the insulation on the wire 10 when the fault comes adjacent the ends, in a manner subsequently to be described. The outer ends of the electrodes 24 are suitably secured to the inner periphery of a circular ring member 26 of an electrically conducting material such as copper, and the ring member is suitably mounted within a housing 27 (FIG. 1) and is insulated in a suitable manner therefrom. In order that the longitudinally moving insulated wire 10 will remain substantially centered with respect to the inner pointed ends of the electrodes 24, a pair of elongated tubular guide members 28, through which the wire passes, are mounted on opposite sides of the housing 27 in alignment with the radial point of the electrodes, as illustrated in FIG. 1.

As is best shown in FIG. 2, the ring member 26 of the probe 23, and thus the electrodes 24 secured to the ring member, are connected by a lead 29 to a high voltage source 31. Thus, as the insulated wire 10, the trailing end of which is grounded at the source of supply 13, as indicated in FIG. 2, passes through the probe 23, its insulation is subjected to high electrical stress such that when a fault in the insulation comes adjacent the inner ends of the probe electrodes 24, an electrical discharge is produced at the fault by the ionization of the gas therein.

The high voltage source 31 preferably is of the direct current type because this voltage has several advantages over voltage of an alternating current type. For example, when direct current voltage is used the insulation on the wire 10 is being subjected to electrical stress constantly and the insulation is always under test, thus permitting the use of a probe having a relatively short length in the direction of movement of the wire, as indicated by the probe device 23. In contrast, when alternating current voltage is used, since alternating current is sinusoidal in nature there are periods when the moving insulated wire 10 is not under test, and thus a relatively longer probe is required in order that all parts of the wire will be tested. Further, the insulated wire 10 must be run at a slower speed than when direct current voltage is used, and the magnitude of the alternating current voltage required to produce results equivalent to that obtained with direct current voltage may be such that the peak voltage will be so high as to cause undesirable sparking when an electrical discharge occurs at a fault in the insulation.

The magnitude of the direct current voltage source 31 is relatively high, as for example on the order of 10 kilovolts, to help insure that an electrical discharge will take place at a fault in the insulation on the wire 10 regardless of the size, shape or position of the fault. However, when a voltage of this magnitude is used the electrical discharge produced generally will be in the form of an electrical arc or spark which may enlarge the fault and further aggravate the condition thereof. Therefore, in accordance with the illustrated embodiment of the invention a resistance 32 is provided between the probe 23 and the high voltage source 31 to limit the current flow which can be produced by the electrical discharge in the lead 29, and thus to limit the energy value of the electrical discharge so that only corona discharge is produced at the fault, that is, ionization of the gas in the fault without an accompanying electrical arc or spark.

As is well known, a corona discharge in a fault in the insulation on a wire, as just described, results in the generation of radio frequency energy and thus the circuitry of the fault detecting device 17 includes a conventional radio receiver 33 (FIG. 2) responsive to this energy. In operation, for best detection results the radio receiver 33 preferably is tuned to a frequency in the range of 0.5 to 1.5 megacycles and at which no strong foreign signal exists. The input to the radio receiver 33, as for example an antenna thereof, is connected by a lead 34 to the lead 29 and a capacitor 36 is provided to prevent the high direct current voltage from passing into the receiver. However, if desired the connection of the lead 34 to the lead 29 can be a loose coupling in the form of several loops of the lead 34 encircling the lead 29 so that there is no direct connection between the high voltage source 31 and the antenna of the receiver 33, in which case the capacitor 36 can be eliminated.

The circuitry of the fault detecting device 17 also includes a radio frequency inductor 37 between the probe 23 and the high voltage source 31, to provide a very high impedance at radio frequencies so that the radio frequency energy produced by the corona discharge in a fault in the insulation on the wire 10 does not flow to ground through the high voltage source, which has a low impedance for radio frequency energy. By way of illustration, where the high voltage source is on the order of 10 kilovolts, as noted hereinabove, and the resistance 32 is 40 megohms, a typical value for the inductor 37 may be 2.5 millihenries.

As is best shown in FIG. 1, the heating device 18 includes an elongated heat chamber 38 which is elliptical in cross section and which has a first focal point along which the insulated wire 10 passes. An elongated heating element 39, such as an infrared lamp (or lamps), is suitably supported in the chamber 38 and extends along a second focal point of the chamber, with the interior surface of the chamber being of a suitable reflecting material such as aluminum so that the radiant energy from the heating element is concentrated about the wire at the first focal point. In order that the insulated wire 10 will remain coincident with the first focal point of the chamber 38 as it passes therethrough, a pair of elongated tubular guide members 40, similar to the guide members 28 associated with the probe 23 and through which the wire passes, are provided as shown in FIG. 1, with the guide 40 adjacent the wire exit end of the chamber 38 being positioned at a suitable distance from the chamber so as to permit the insulation on the wire 10 to air cool and thereby resolidify before it reaches the guide.

The heating capacity of the heating element 39 required in any one instance will vary depending upon various factors, as for example, the speed of the insulated wire 10 through the chamber 38, the type of wire insulation, the length of the chamber and the heat reflecting and absorption qualities thereof. Further, the amount of heat energy required at the first focal point of the heat chamber 38 to seal a fault and/or the heating time required to seal a fault will be dependent upon the color of the insulation, with white or light colored insulations requiring 2–4 times as much heat, or 2–4 times as long a heating time, as black or dark colored insulations. However, in general the heating element 39 must have a heating capacity such that it is capable of producing heat energy at the first focal point of the chamber 38 in an amount sufficient to cause the insulation on the wire 10 in the vicinity of a fault in the insulation to flow slightly as the wire passes through the chamber, so that the fault in the insulation will be eliminated without otherwise changing the character or shape of the insulation to any substantial degree.

Referring to FIG. 2, it is seen that the heating element 39 forms a part of a closed branch 41 of an energizing circuit designed to provide quick energization of the heating element upon the detection of a fault by the detecting mechanism 17, and such that the magnitude of the current required in the circuit for energizing the heating element is kept to a minimum. In this regard, the closed branch 41 of the energizing circuit includes a resistance 42 which is variable to a magnitude such that the voltage across the heating element 39 can be reduced in value, as for example from 115 to 80 volts, and such that the current normally flowing in the branch can be reduced in value, whereby the heating element normally is in only a partially energized state. However, the energizing circuit also includes a normally open branch 43 which is connectable in parallel with the resistance 42 upon closure of a contact 44 by a relay 46, to electrically short the resistance 42 and to cause the voltage drop across the resistance to fall to zero, whereby full operating voltage is applied across the heating element 39 and the current in the energizing circuit increases such that the heating element becomes fully energized.

The energizing circuits, as above described, has several advantages over an arrangement in which the heating element 39 is heated from a cold state. For example, the heating element 39 can be energized more quickly and thus heat energy can be provided more rapidly at the first focal point of the heat chamber 38 for repairing a fault in the insulation 10. Further, if the heating element 39 were heated from a cold state, since the cold resistance of a conductor is considerably lower than its hot resistance and since, in the case of an infrared lamp, a considerable portion of the final current would be required for heating the element to a temperature in which it would emit radiant energy for heating purposes, a considerably larger energizing current would be required than in the energizing circuit shown. This would produce a greater load on the contact 44 and would require that the contact and its leads be of heavier construction to be capable of carrying the higher current. In addition, the repeated turning of the heating element 39 on and off would tend to reduce its life expectancy. These advantages are especially desirable in the application of the invention shown in the drawings because of the frequent energizing of the heating element 39 which may be required for the repairing of the insulation on the wire 10. Further, it is apparent that the energizing circuit shown is more advantageous from a power saving standpoint than if the heating element 39 always was fully energized.

When a fault in the insulation on the insulated wire 10 is detected by the fault detecting mechanism 17, as above described, the normally open contact 44 is closed by the relay 46, which is energized by a timer 47, the timer having been actuated by the closing of a contact 48 by a relay 49 in response to a signal from the radio receiver 33. The timer 47 may be of any suitable adjustable type which is designed to reset itself automatically to zero upon receiving a new signal before it times out. Thus, the timer 47 can be set so that it will time out to deenergize the relay 46 and thereby permit the contact 44 to open to return the heating element 39 to its partially energized state when a fault in the insulation on the wire 10 reaches the exit end of the heat chamber 38. However, in the event that another fault is detected by the fault detecting mechanism 17 before the fault traveling through the chamber 38 reaches its exit end, the timer 47, upon being reactuated as a result of the contact 48 being reclosed by the relay 49 in response to a new signal from the radio receiver 33, will reset itself to zero and begin to time out again, whereby the contact 44 will remain closed and the heating element 39 will remain fully energized.

The distance traveled by the wire 10 from the probe 23 to the entrance end of the heat chamber 38 is a function of the speed of the wire and the time required for the heating element 39 to reach its fully energized condition, and preferably should be such that the heating element reaches its fully energized condition at the time the fault in the insulation on the wire enters the heat chamber. In this regard, rather than the wire 10 traveling in a straight line between the probe 23 and the heat chamber 38, as shown in the drawings, it may be necessary or desirable that the wire pass about a plurality of spaced rotatable sheaves having their axes of rotation arranged parallel to one another in a well known manner.

Referring to FIG. 4, it is seen that the heat chamber 38 may be in the form of a dual reflector 38′ in which two substantially elliptical sections are connected together to form an integral unit and so as to have a common focal point along which the insulated wire 10 passes through the heat chamber. An elongated infrared lamp 39′ or a similar type heating element is suitably mounted in each of the elliptical sections so as to extend along its other focal point, whereby the radiant energy from each lamp is reflected by the interior surface of the member to the common focal point along which the wire 10 passes. As indicated in FIG. 4, the lamps 39′ are connected in parallel by leads 51 for connecting the lamps into a branch of an energizing circuit in the same manner that the lamp 39 in FIGS. 1 and 2 is connected into the energizing circuit branch 41.

As shown in FIG. 5, the heat chamber 38 also may be in the form of an elongated cylindrical member 38″ in which the wire 10 passes along the longitudinal axis of the cylindrical member. A plurality of elongated heating elements 39″, such as infrared lamps, are suitably mounted in the cylindrical member with their longitudinal axes in circumferentially arranged relationship with respect to the longitudinal axis thereof. Thus, the radiant energy from the heating elements 39″ is reflected by the interior surface of the cylindrical member 38″ and concentrated at the axis thereof for repairing faults in the insulation on the wire 10 as the wire travels through the member. Further, as in the case of the heating elements 39′ in the heat chamber 38′ shown in FIG. 4, the heating elements 39″ are connected in parallel by suitable leads 52.

In operation, the wire 10 is pulled from the wire supply 13 and passes through the wire drawing machine 14 and the continuous annealer 16. The wire then is advanced by the capstan 9 through the plastic extruder 11, which extrudes plastic insulation thereon, and through the water cooling trough 12. The now insulated wire 10 then travels through the radial point of the electrodes 24 of the probe mechanism 23, where it is subjected to high electrical stress such that when a fault in the insulation comes adjacent the inner ends of the electrodes, an electrical discharge is produced at the fault by the ionization of the gas therein. When the electrical discharge occurs, the resistance 32 limits the current flow which can be produced thereby in the lead 29 to limit the energy value of the electrical discharge so that only corona discharge is produced at the fault, that is, an electrical discharge without an accompanying electrical arc or spark which might enlarge the fault and further aggravate the condition thereof.

The corona discharge at the fault results in an emission of radio frequency energy, which is prevented from flowing to ground through the high voltage source 31 by the inductance 37, and which is detected by the radio receiver 33. The radio receiver 33 then energizes the relay 49 which closes the contact 48 to energize the timer 47 and its associated relay 46. Energization of the relay 46 closes the contact 44 so that the partially energized heating element 39 in the heat chamber 38 becomes fully energized, whereby as the fault in the insulation on the wire 10 passes through the heat chamber, heat is applied to the insulation adjacent the fault in an amount sufficient to cause the insulation to flow such that upon resolidification of the insulation the fault is substantially eliminated.

When the fault in the insulation on the wire 10 reaches the exit end of the heat chamber 38, the timer 47 times out to deenergize the relay 46 whereby the contact 44 opens and the heating element 39 returns to its partially energized state. However, in the event that a succeeding fault in the insulation is detected by the fault detecting mechanism 17 before the fault has reached the exit end of the heat chamber 38, the timer 47, upon the closing of the contact 48 by energization of the relay 49 in response to a new signal from the radio receiver 33 of the fault detecting mechanism, resets itself automatically to zero and begins timing out again, whereby the contact 44 remains closed and the heating element 39 remains fully energized.

After leaving the heat chamber 38 of the heating device 18, the heated insulation on the wire 10 resolidifies and the repaired wire passes about the sheave 19 and through the sparker 21, which subjects it to a conventional high voltage dielectric strength test to determine whether the fault is still present. The insulated wire then proceeds about the idler sheave 22 and finally is wound on reels by the takeup mechanism, not shown.

While certain embodiments of the invention have been disclosed, many modifications will be apparent and it is intended that the invention be interpreted as including all modifications which fall within the true spirit and scope of the invention.

What is claimed is:

1. Apparatus for repairing electrically nonconducting material, which comprises:
   means for subjecting the material to a sufficiently high electrical stress as to produce an electrical discharge at a fault in the material;
   means responsive to the electrical discharge for detecting the fault; and
   heat producing means for applying localized heat to the exterior of the material adjacent the fault to cause the material in the vicinity of the fault to flow such that upon resolidification of the material the fault is substantially eliminated.

2. Apparatus for repairing electrically nonconducting material, as recited in claim 1, which further includes means responsive to said detecting means for energizing said heat producing means.

3. Apparatus for repairing electrically nonconducting material, which comprises:
   means for subjecting the material to a sufficiently high electrical stress as to produce an electrical discharge at a fault in the material;
   means for limiting the energy value of the electrical discharge to prevent the formation of an electrical arc so that only corona discharge and a radio frequency energy emission resulting therefrom are produced at the fault;
   heat producing means for applying localized heat to the exterior of the material adjacent the fault to cause the material in the vicinity of the fault to flow such that upon resolidification of the material the fault is substantially eliminated; and
   detecting means responsive to the radio frequency energy emission resulting from the corona discharge, for energizing said heat producing means.

4. Apparatus for repairing electrically nonconducting material, which comprises:
   means for subjecting the material to a sufficiently high electrical stress as to produce an electrical discharge at a fault in the material;
   detecting means responsive to the electrical discharge produced as a result of the fault;
   an electrical heating element forming a part of a closed electrical circuit, for applying localized heat to the exterior of the material adjacent the fault to cause the material in the vicinity of the fault to flow such that upon resolidification of the material the fault is substantially eliminated;
   resistance means in the closed circuit for reducing the voltage across said heating element and the current normally flowing in the circuit to values such that said heating element normally is in only a partially energized state;
   means for reducing the effective value of said resistance means such that the voltage across said heating element and the current in the closed circuit increase and said heating element becomes fully energized; and
   means operable by said detecting means for actuating said resistance value reducing means, whereby said heating element becomes fully energized.

5. Apparatus for repairing electrically nonconducting material, as recited in claim 4, and further including means for effecting deactuation of said resistance value reducing means after a predetermined time lapse, whereupon said heating element returns to its partially energized state.

6. Apparatus for repairing an elongated strand during relative movement of the strand and the apparatus in a direction extending parallel to the longitudinal axis of the strand, wherein the strand is formed at least in part of electrically nonconducting material, which apparatus comprises:
   a plurality of needle-like electrodes arranged in radially extending relationship and having adjacent inner pointed ends in close proximity to the strand during relative movement between said electrodes and the strand;
   means connecting said electrodes to a source of high voltage of a magnitude such that the electrically nonconducting material is subjected to a sufficiently high electrical stress as to produce an electrical discharge at a fault in the material when the fault and the inner ends of the electrodes come adjacent one another;
   means for limiting the energy value of the electrical discharge to prevent the formation of an electrical arc so that only corona discharge and a radio frequency energy emission resulting therefrom are produced at the fault;

heat producing means for applying localized heat to the exterior of the strand adjacent the fault to cause the electrically nonconducting material in the vicinity of the fault to flow such that upon resolidification of the material the fault is substantially eliminated; and fault detecting means responsive to the radio frequency energy emisison resulting from the corona discharge, for energizing said heat producing means.

7. Apparatus for repairing an elongated strand during relative movement of the strand and the apparatus in a direction extending parallel to the longitudinal axis of the strand, wherein the strand is formed at least in part of electrically nonconducting material, which apparatus comprises:

electrical probe means in close proximity to the strand during relative movement between said probe means and the strand;

means connecting said probe means to a source of high voltage of a magnitude such that the electrically nonconducting material is subjected to a sufficiently high electrical stress as to produce an electrical discharge at a fault in the material when the fault and said probe means come adjacent one another;

an elongated tubular chamber through which the strand passes during relative movement between said chamber and the strand;

an electrical heating element extending through said chamber in spaced parallel relationship with respect to the path of movement of the strand through said chamber, said chamber having an interior heat reflecting surface which concentrates the heat from said heating element about the strand as it passes through said chamber so that the heat derived from said heating element is applied to the strand without said heating element coming into contact therewith, and said heating element being capable of producing heat energy about the strand in an amount sufficient to cause the electrically nonconducting material in the vicinity of the fault to flow during the period that the portion of the strand containing the fault is in said chamber, such that upon resolidification of the material the fault is substantially eliminated; and means responsive to the electrical discharge produced as a result of the fault, for energizing said heating element.

8. Apparatus for repairing thermoplastic insulation on a grounded insulated electrical conductor wire as the wire is being advanced longitudinally, which comprises:

a plurality of needle-like electrodes arranged in radially extending relationship with respect to a common point and having adjacent inner pointed ends spaced radially from the point so that the wire can move longitudinally through the point in close proximity to the pointed ends of the electrodes;

a source of relatively high direct current voltage connected to said electrodes and having a magnitude such that the insulation is subjected to a sufficiently high electrical stress as to produce an electrical discharge at a fault in the insulation as the fault and the inner ends of said electrodes come adjacent one another;

resistance means for limiting the energy value of the electrical discharge to prevent the formation of an electrical arc so that only corona discharge and a radio frequency energy emission resulting therefrom are produced at the fault;

a high impedance inductance for preventing the radio frequency energy from flowing to ground through said high direct current voltage source;

fault detecting means operable in response to the radio frequency energy;

an elongated tubular chamber located after said electrodes along the path of movement of the wire and through which the wire passes;

an elongated electrical heating element forming a part of a closed electrical circuit and extending through said chamber in spaced parallel relationship with respect to the path of movement of the wire through said chamber, said chamber having an interior reflecting surface for concentrating the heat derived from said heating element about the insulated wire as it passes through said chamber, so that the heat from said heating element is applied to the insulation on the wire without said heating element coming into contact therewith, and said heating element being capable of producing heat energy about the wire in an amount sufficient to cause the insulation on the wire in the vicinity of the fault to flow as the wire passes through said chamber, such that upon resolidification of the insulation the fault is substantially eliminated;

resistance means in the closed circuit of said heating element for reducing the voltage across said heating element and the current flowing in the circuit to values such that said heating element normally is in only a partially energized state;

means connectable in parallel with said resistance means for reducing the effective resistance value thereof such that the voltage across said heating element and the current in the closed circuit increase and said heating element becomes fully energized;

means operable by said fault detecting means for connecting said resistance value reducing means in parallel with said resistance means, whereby said heating element becomes fully energized; and means for effecting disconnection of said resistance value reducing means when the portion of the insulation which contained the fault reaches the exit end of said chamber, whereby said heating element is returned to its partially energized state, said effecting means being operative to effect the disconnection only if a succeeding fault in the insulation on the wire has not yet come adjacent said electrodes.

References Cited by the Examiner

UNITED STATES PATENTS

| | | | |
|---|---|---|---|
| 2,753,521 | 7/1956 | Abrams | 324—51 X |
| 2,894,204 | 7/1959 | Gambrill | 324—54 |
| 2,900,597 | 8/1959 | Gooding | 324—54 |

FOREIGN PATENTS 123,872  3/1947  Australia.

WILLIAM J. STEPHENSON, *Primary Examiner.*